US005688832A

United States Patent [19]

Paquet et al.

[11] Patent Number: 5,688,832
[45] Date of Patent: Nov. 18, 1997

[54] LOW MOLECULAR WEIGHT ALKENYL AROMATIC POLYMER FOAM

[75] Inventors: Andrew N. Paquet; Warren H. Griffin, both of Granville, Ohio

[73] Assignee: The Dow Chemical Company, Midland, Mich.

[21] Appl. No.: 612,943

[22] PCT Filed: Sep. 16, 1994

[86] PCT No.: PCT/US94/10491

§ 371 Date: Mar. 12, 1996

§ 102(e) Date: Mar. 12, 1996

[87] PCT Pub. No.: WO95/10560

PCT Pub. Date: Apr. 20, 1995

[51] Int. Cl.[6] .................................................. C08J 9/08
[52] U.S. Cl. ............................ 521/79; 521/97; 521/146
[58] Field of Search ............................. 521/97, 79, 146

[56] References Cited

U.S. PATENT DOCUMENTS

| 4,513,105 | 4/1985 | Hahn et al. | 521/56 |
| 4,525,484 | 6/1985 | Hahn et al. | 521/56 |
| 4,528,221 | 7/1985 | Komatsuzaki et al. | 428/35 |
| 5,250,577 | 10/1993 | Welsh | 521/97 |
| 5,286,429 | 2/1994 | Blythe et al. | 264/51 |

FOREIGN PATENT DOCUMENTS

| 0528536A1 | 2/1993 | European Pat. Off. | C08J 9/12 |

*Primary Examiner*—Morton Foelak
*Attorney, Agent, or Firm*—J. Robert Dean, Jr.

[57] ABSTRACT

Disclosed is a foam structure of desirable mechanical strength made with a low molecular weight alkenyl aromatic polymer material and an inorganic blowing agent. The polymer material has an alkenyl aromatic polymer of a weight average molecular weight of 100,000 to 165,000. The foam structure can be made in processes with reduced pressure drop.

12 Claims, No Drawings

LOW MOLECULAR WEIGHT ALKENYL AROMATIC POLYMER FOAM

The present application, International Publication No. WO 95/10560, published on 20 Apr. 1995, is a continuation-in-part of U.S. Ser. No. 08/137,234, filed 14 Oct. 1993, abandoned.

This invention relates to a low molecular weight alkenyl aromatic polymer foam structure having desirable physical properties. Further, the invention relates to a process for making such foam structures with an inorganic blowing agent.

Alkenyl aromatic polymer foam structures heretofore have been made with organic blowing agents. Such agents include aliphatic hydrocarbons, chlorocarbons, chlorofluorocarbons, and hydrofluorocarbons. The use of some of these agents has been criticized for potential ozone depletion and other environmental effects.

Due to present environmental concerns over organic blowing agents, it is desirable to make alkenyl aromatic polymer foam structures with an inorganic blowing agent such as carbon dioxide, nitrogen, argon, air, and helium.

A problem with using inorganic blowing agents for alkenyl aromatic polymer foam structures is their relatively low solubility in melts of the alkenyl aromatic polymer. The low solubility results in high system pressure, which results in high pressure drop and high die pressure. Lowering pressure drop and die pressure would save energy costs and reduce the pressure duty requirements for process equipment.

One means of reducing operating pressures in making foam structures is to employ low molecular weight alkenyl aromatic polymers. Such low molecular weight polymers typically have a weight average molecular weight of 100,000 to 165,000 according to size exclusion chromotography (SEC). Polymers commonly employed in making commercial foam structures typically have a weight average molecular weight of 200,000 to 300:000 according to SEC. The processing advantages of the low molecular weight polymers include potentially lower operating and foaming temperatures and lower operating pressures and pressure drops.

A problem with using low molecular weight alkenyl aromatic polymers is the relatively low mechanical strength observed in foam structures made with some conventional organic blowing agents. Typically, as number average molecular weight decreases, the glass transition temperature decreases. A relatively low glass transition temperature usually makes the foam more brittle, which affects the mechanical strength of the foam structure in certain applications. The problem of mechanical strength is particularly apparent in relatively low temperature applications such as in refrigeration insulation or relatively high temperature applications such as in roof insulation. The reduction in mechanical strength also becomes apparent in large cell (greater than 0.8 millimeter) foam structures, such as those used in buoyancy applications and decorative and craft applications.

It would be desirable to make foam structures with low molecular weight alkenyl aromatic polymers yet maintain levels of mechanical strength typically observed with high molecular weight polymers. It would be further desirable to make such foam structures that exhibit desirable mechanical strength in a variety of applications and temperature environments.

According to the present invention, there is an alkenyl aromatic polymer foam structure comprising an alkenyl aromatic polymer material and a blowing agent. The alkenyl aromatic polymer material comprises greater than 50 percent by weight alkenyl aromatic monomeric units. The polymer material comprises an alkenyl aromatic polymer having a weight average molecular weight of 100,000 to 165,000 according to SEC. The blowing agent comprises 50 percent or more by weight of an inorganic blowing agent based upon the total weight of the blowing agent. A preferred blowing agent is carbon dioxide. Surprisingly, the foam structure has mechanical properties at levels which may correspond to those of foam structures of higher molecular weight blown with conventional organic blowing agents.

Further according to the present invention, there is a foamable alkenyl aromatic polymer gel comprising a melt of an alkenyl aromatic polymer material and a blowing agent. The composition of the alkenyl aromatic polymer material and the blowing agent is as described above.

Further according to the present invention, there is a process for making an alkenyl aromatic polymer foam structure. The process comprises: a) heating an alkenyl aromatic polymer material; b) incorporating into the melt polymer material at an elevated pressure a blowing agent to form a foamable gel; and c) expanding the foamable gel at a lower pressure to form a foam structure. The composition of the alkenyl aromatic polymer material and the blowing agent is as described above. Preferably, the foamable gel is expanded by extruding it through a die to a zone of lower pressure to form the foam structure.

The present foam structure comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene.

Minor amounts of monoethylenically unsaturated compounds such as $C_{1-4}$ alkyl acids and esters, ionomeric derivatives, and $C_{2-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. The alkenyl aromatic polymer material preferably comprises substantially (that is, greater than 95 percent) and most preferably entirely polystyrene because polystyrene is economical, and has desirable physical properties.

The alkenyl aromatic polymer useful in the present invention has a weight average molecular weight of 100,000 to 165,000, preferably 100,000 to less than 150,000, and most preferably from 125,000 to 145,000 according to size exclusion chromotography (SEC). Preferably, the polymer has a polydispersity index of 2.0 to 3.5 and more preferably 2.05 to 3.0. The polydispersity index is the ratio of weight average molecular weight to number average molecular weight ($M_w/M_n$), with both types of molecular weight being determined by SEC.

The use of low molecular weight alkenyl aromatic polymer affords several processing advantages over high molecular weight alkenyl aromatic polymers (that is, 200,000 or more weight average molecular weight according to SEC) heretofore employed in making foam structures. The processing advantages include potentially lower operating temperatures, including mixing temperatures and foaming temperatures. Processing advantages further include lower power consumption and operating pressures such as mixing pressures, die pressures, and pressure drop along portions of or the entire process.

The blowing agent comprises 50 percent or more and preferably 50 to 95 percent by weight of an inorganic blowing agent based upon the total weight of the blowing agent. Desirable inorganic blowing agents include carbon dioxide, nitrogen, air, water, helium, and argon. A preferred inorganic blowing agent is carbon dioxide.

The use of an inorganic blowing agent and low molecular weight alkenyl aromatic polymers in the present foam structure allows certain important physical properties to generally correspond and preferably substantially correspond to those typically observed in foam structures using higher molecular weight alkenyl aromatic polymers blown and conventional organic blowing agents. Those important physical properties include compressive strength, flexural strength, and heat distortion temperature. The above properties are particularly important in insulating foam applications. The present foam structure need not correspond in all physical properties however, as all physical properties are not critical.

Though not bound by any particular theory, the inorganic blowing agents are believed to enhance the physical properties of the present foam structure because they no not significantly plasticize melts of the low molecular weight alkenyl aromatic polymer, and further do not significantly depress its glass transition temperature. Use of an inorganic blowing agent enables plasticization and glass transition temperature to be controlled. In contrast, conventional organic blowing agents plasticize such polymer melts, and depress the glass transition temperature of such polymers.

An additional surprising feature of the present invention is that when inorganic blowing agent systems are employed, reduction in weight average molecular weight of the polymer material does not result in significant diminution of important physical properties. Thus, the present foam structure, which employs a low molecular weight polymer and an inorganic blowing agent, exhibits performance levels in certain important physical properties which at least generally correspond to foam structures employing a polymer of conventional molecular weight (that is, 200,000 to 300,000 weight average molecular weight according to SEC) and an inorganic blowing agent. This is surprising since a reduction in molecular weight of the polymer material in a foam structure, particularly when organic blowing agents are employed, typically results in a diminution in physical properties.

Blowing agents useful in combination with the inorganic blowing agent include organic blowing agents and chemical blowing agents. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms.

Aliphatic hydrocarbons include methane, ethane, propane, n-butane, isobutane, n-pentane, isopentane, neopentane, dimethyl ether, methyl ethyl ether, and diethyl ether. Aliphatic alcohols include methanol, ethanol, n-propanol, and isopropanol. Fully and partially halogenated aliphatic hydrocarbons include fluoroethers, fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent incorporated into the polymer melt material to make a foam-forming polymer gel is from 0.2 to 5.0, preferably from 0.5 to 3.0, and most preferably from 1.0 to 2.50 moles per kilogram of polymer.

The present alkenyl aromatic polymer foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum or evacuated), but is preferably at an atmospheric level.

The present foam structure has the density of from 10 to 150 kilograms per cubic meter ($kg/m^3$), preferably from 10 to 70 $kg/m^3$, more preferably from 10 to 56 $kg/m^3$, and most preferably from 32 to 48 $kg/m^3$ according to ASTM D-1622. The foam structure has an average cell size of from 0.05 to 5.0 millimeters and preferably from 0.2 to 2.4 millimeters according to ASTM D3576-77.

The present foam structure may take any physical configuration known in the art, such as sheet, plank, or coalesced, parallel strands. The present structure is particularly suited to be formed into a plank, desirably one having a cross-section of 30 square centimeters (cm²) or more and a cross-section thickness in minor dimension of greater than ⅜ inch (9.5 millimeter) and preferably ½ inch (12.7 millimeter) or greater.

The foam component of the present foam structure may be closed cell or open cell. Preferably, the present foam is greater than 90 percent closed-cell according to ASTM D2856-A.

Various additives may be incorporated in the present foam structure such as inorganic fillers, pigments, antioxidants, acid scavengers, ultraviolet absorbers, flame retardants, processing aids, and extrusion aids.

In addition, a nucleating agent may be added in order to control of the size of foam cells. Preferred nucleating agents include inorganic substances such as calcium carbonate, talc, clay, titanium oxide, silica, barium sulfate, diatomaceous earth, and mixtures of citric acid and sodium bicarbonate. The amount of nucleating agent employed may range from 0.01 to 5 parts by weight per hundred parts by weight of a polymer resin. The preferred range is from 0.02 to 3 parts by weight.

Though the preferred process for making the present structure is an extrusion process, it is understood that the above structure may be formed by expansion of pre-expanded beads containing a blowing agent. The expanded beads may be molded at the time of expansion to form articles of various shapes. Insulating panels formed from molded, expanded beads are commonly referred to as bead board. Processes for making pre-expanded beads and molded expanded bead articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989).

The present foam structure may be used to insulate a surface by applying to the surface an insulating panel fashioned from the present structure. Such panels are useful in any conventional insulating applications such as roofing, buildings, and refrigerators.

The present foam structure may be formed into a plurality of discrete foamed particles for conventional loose-fill cushioning and packaging applications, or may be ground into scrap for use as blown insulation.

The present foam structure in large cell size (0.8 millimeter or more) is useful as buoyancy billets as well as floral and art/craft applications.

The following are examples of the present invention, and are not to be construed as limiting. Unless otherwise indicated, all percentages, parts, or proportions are by weight.

Alkenyl aromatic polymer foam structures of the present invention were made according to the process of the present invention.

EXAMPLE 1 AND CONTROL EXAMPLE 1

A foam structure of the present invention and a control foam structure were made using a 1½ inch (3.8 centimeter (cm)) single-screw extruder, a mixer, a cooler, and a die in series. A blowing agent was injected at a blowing agent feedport of the mixer.

The foam structure of the present invention was made with a polystyrene resin of a $M_w$ of 127,000 and a $M_n$ of about 55,000. The control structure was made using a polystyrene resin of a weight average molecular weight ($M_w$) of 200,000 and a number average molecular weight ($M_n$) of about 85,000.

The blowing agent used was 4 parts per hundred (pph) of carbon dioxide and 0.2 pph of water based upon the weight of polystyrene. Polystyrene was fed to the extruder at a rate of 15 pounds per hour (6.8 kilograms per hour).

The present foam structure could be made at a substantially lower pressure drop than the control structure, and exhibited similar or substantially similar heat distortion temperature, density, cell size, open-cell content, and cross-section as seen in Table 1. Most notably, pressure drop was reduced significantly by employing the lower molecular weight resin without impacting heat distortion temperature.

TABLE 1

Foam Structures of Example 1 and Control Example 1

| Run | $T_f^1$ (°C.) | Density² (kg/m³) | Cell Size³ (mm) | Open Cell⁴ (percent) | Cross-Section⁵ (cm²) | HDT⁶ (°F.) | ΔP⁷ (bar) |
|---|---|---|---|---|---|---|---|
| 1* | 130 | 39.7 | 0.08 | 0 | 2.03 | 180 | 84 |
| 2 | 130 | 35.1 | 0.09 | 0 | 1.76 | 180 | 51 |

*Not an example of the present invention (control structure)
¹Foaming temperature (°C.)
²Density in kilograms/cubic meter (kg/m³)
³Vertical cell size in millimeters (mm) according to ASTM D3576-77
⁴Open cell content in percentage according to ASTM D2856-A
⁵Foam structure cross-section in square centimeters (cm²)
⁶Heat distortion temperature in °F. Run 1 was measured after about 8 days and Run 2 after about 9 days.
⁷Pressure drop between the blowing agent feedport of the mixer and the inlet of the die

EXAMPLE 2 AND CONTROL EXAMPLE 2

A large-cell foam structure of the present invention and a control foam structure were made with a 2½ inch (6.4 cm) single-screw extruder, a mixer, coolers, and a die in series.

The present structure was made with a polystyrene resin of a $M_w$ of 127,000 and a $M_n$ of 55,000. The control structure was made with a polystyrene resin of a $M_w$ of 200,000 and a $M_n$ of 85,000.

The blowing agent used was 2 pph carbon dioxide and 1.6 pph of water. The blowing agent was injected at a blowing agent feedport of the mixer.

The present foam structure is of large cell size, and is useful in decorative billet applications.

The present foam structure could be made at a substantially lower pressure drop than the control structure, and exhibited very similar physical properties as seen in Table 2. Thus, pressure drop was reduced significantly by employing the lower molecular weight resin without significant diminution of physical properties.

TABLE 2

Foam Structures of Example 2 and Control Example 2

| Run | Density¹ (kg/m³) | Cell Size² (mm) | HDT³ (°F.) | ΔP⁴ (bar) |
|---|---|---|---|---|
| 1* | 31.4 | 1.62 | 160 | 136 |
| 2 | 29 | 1.80 | 160 | 74 |

*Not an example of the present invention (control structure)
¹Density in kilograms/cubic meter (kg/m³)

TABLE 2-continued

Foam Structures of Example 2 and Control Example 2

| Run | Density[1] (kg/m³) | Cell Size[2] (mm) | HDT[3] (°F.) | ΔP[4] (bar) |
|---|---|---|---|---|

[2]Vertical cell size in millimeters (mm) according to ASTM D3576-77
[3]Heat distortion temperature in °F. Run 1 was measured after about 2 weeks and Run 2 after about 2 weeks.
[4]Pressure drop between the blowing agent feedport of the mixer and the inlet of the die While embodiments of the foam structure and the process of the present invention have been shown with regard to specific details, it will be appreciated that depending upon the manufacturing process and the manufacturer's desires, the present invention may be modified by various changes while still being fairly within the scope of the novel teachings and principles herein set forth.

We claim:

1. A process for making an extruded alkenyl aromatic polymer foam structure having a cross-section thickness in minor dimension of greater than 9.5 millimeters and a cross-section of 30 square centimeters or more, comprising:
   a) heating to form a melt polymer material an alkenyl aromatic polymer material comprising greater than 50 percent by weight alkenyl aromatic monomeric units and further comprising a weight average molecular weight of 125,000 to to 145,000 and a polydispersity index of 2.05 to 3.0;
   b) incorporating into the melt polymer material at an elevated pressure a blowing agent comprising 50 percent or more by weight of an inorganic blowing agent based upon the total weight of the blowing agent to form a foamable gel;
   c) cooling the foamable gel to an optimum foaming temperature; and
   d) extruding the foamable gel through a die to a zone of lower pressure to form a foam structure.

2. The process of claim 1, wherein the blowing agent comprises 70 percent or more by weight of the inorganic blowing agent based upon the total weight of the blowing agent.

3. The process of claim 1, wherein the blowing agent is carbon dioxide.

4. The process of claim 1, wherein the alkenyl aromatic polymer material comprises 70 percent or more by weight alkenyl aromatic monomeric units.

5. The process of claim 1, wherein the alkenyl aromatic polymer material comprises polystyrene.

6. The process of claim 1, wherein the foam structure is greater than 90 percent closed-cell.

7. The process of claim 1, wherein the foam structure has an average cell size of 0.1 to 5.0 millimeters.

8. The process of claim 1, wherein the foam structure has a density of 10 to 150 kilograms per cubic meter.

9. The process of claim 1, wherein the blowing agent comprises 70 percent or more by weight of an inorganic blowing agent based upon the total weight of the blowing agent, the inorganic blowing agent being carbon dioxide, the alkenyl aromatic polymer material comprises 70 percent or more by weight alkenyl aromatic monomeric units, the alkenyl aromatic polymer comprising polystyrene, the foam structure having an average cell size of 0.1 to 5.0 millimeters, the foam structure having a density of 10 to 150 kilograms per cubic meter, the foam having a cross-section in minor dimension of 12.7 millimeters or greater.

10. The process of claim 9, wherein the alkenyl aromatic polymer has a polydispersity index of 2.05 to 3.0, the average cell size being from 0.2 to about 2.4 millimeters, the foam having a density of about 10 to about 70 kilograms per cubic meter.

11. The process of claim 9, wherein the foam structure is greater than 90 percent closed cell.

12. The process of claim 10, wherein the foam structure is greater than 90 percent closed cell.

* * * * *